(12) United States Patent
Lanner et al.

(10) Patent No.: US 11,620,121 B1
(45) Date of Patent: Apr. 4, 2023

(54) CONTROLLING THE APPROVAL OF SOFTWARE UPDATES FOR COMPUTING RESOURCES

(71) Applicant: Amazon Technologies, Inc., Seattle, WA (US)

(72) Inventors: Mats Erik Lanner, Seattle, WA (US); Derek Ying Chen Kwiatkowski, Seattle, WA (US); Katherine Elizabeth Shaffer, Mill Creek, WA (US); Sivaprasad Venkata Padisetty, Bellevue, WA (US); Sundaresan Ramamoorthy, Bellevue, WA (US); Robert Glenn Hearn, Renton, WA (US); Amjad Hussain, Bellevue, WA (US); Daniel Francis Conde, Lake Forest Park, WA (US); Lavanya Krishnan, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/033,503

(22) Filed: Sep. 25, 2020

Related U.S. Application Data

(63) Continuation of application No. 16/271,360, filed on Feb. 8, 2019, now Pat. No. 10,817,278, which is a (Continued)

(51) Int. Cl.
  *G06F 9/445* (2018.01)
  *G06F 8/65* (2018.01)
  (Continued)

(52) U.S. Cl.
  CPC .......... *G06F 8/65* (2013.01); *H04L 67/75* (2022.05); *H04L 67/306* (2013.01)

(58) Field of Classification Search
  CPC .......... G06F 8/65; H04L 67/36; H04L 67/306
  (Continued)

(56) References Cited

U.S. PATENT DOCUMENTS

2011/0126197 A1  5/2011  Larsen et al.
2012/0102189 A1  4/2012  Burge et al.
(Continued)

OTHER PUBLICATIONS

Office Action for U.S. Appl. No. 16/271,360, dated Dec. 31, 2019, Lanner, "Controlling the Approval of Software Updates for Computing Resources", 9 Pages.
(Continued)

*Primary Examiner* — Chuck O Kendall
(74) *Attorney, Agent, or Firm* — Lee & Hayes, P.C.

(57) ABSTRACT

This disclosure describes techniques for providing users of services provided by network-based service platforms with additional control for approving patches that are to be deployed to computing resources that support their services. In some examples, the techniques include generating and using a "snapshot," or list, of patches that are preliminarily approved for deployment. Prior to deploying the patches to the computing resources, users are provided with access to the snapshot and are able to modify the snapshot. For example, users can modify the snapshot by adding patches, removing patches, specifying a sequence in which the patches are to be deployed, and so forth. The snapshot of patches may be "frozen" for a period of time, meaning that patches that during the period of time, only patches in the snapshot are deployed, and patches that are not included in the snapshot are not permitted to be deployed to computing resources.

17 Claims, 11 Drawing Sheets

Related U.S. Application Data continuation of application No. 15/989,686, filed on May 25, 2018, now Pat. No. 10,282,193.

(51) Int. Cl.
*H04L 67/75* (2022.01)
*H04L 67/306* (2022.01)

(58) Field of Classification Search
USPC .................................................. 717/168, 178
See application file for complete search history.

(56) References Cited

U.S. PATENT DOCUMENTS

2013/0247023 A1* 9/2013 Aderton .............. H04L 41/0803
717/172
2020/0012488 A1* 1/2020 Koval ....................... G06F 8/71

OTHER PUBLICATIONS

Office Action for U.S. Appl. No. 16/271,360, dated Jun. 14, 2019, Lanner, "Controlling the Approval of Software Updates for Computing Resources", 8 pages.

* cited by examiner

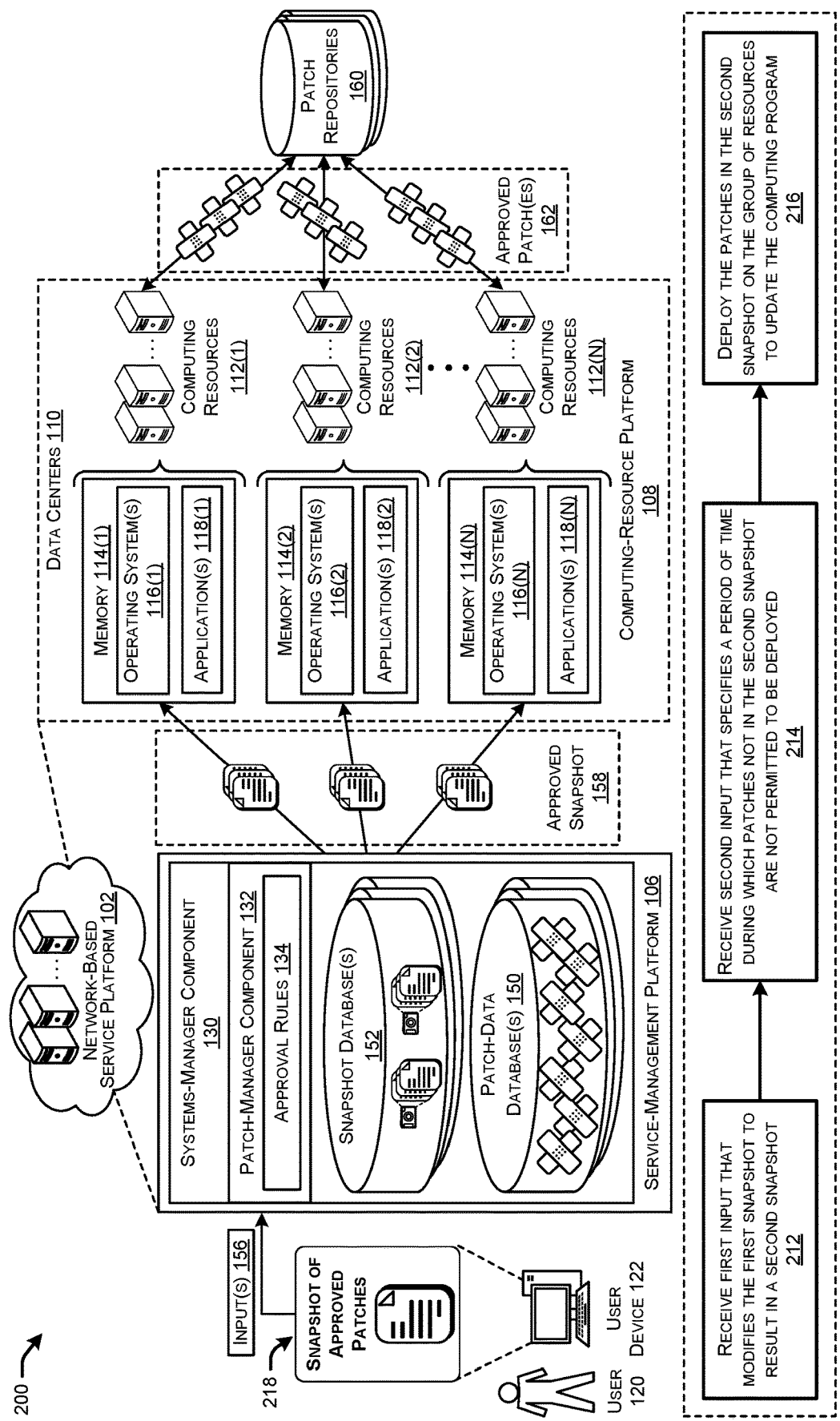

300

CREATE PATCH BASELINE - APPROVAL RULES

302 — Provide patch baseline details:

Name
| Operating System Baseline |

Description
| Patch baseline for the operating systems |

Computer Program
| Operating System |

304 — Approval rules:

| Product | Classification | Auto-approval delay |
|---|---|---|
| Select products ▼ | Select classific... ▼ | 4 days |
| Operating System ☒ | SecurityUpdates ☒ | |
| Select products ▼ | Select classific... ▼ | Auto-approval delay |
| Operating System ☒ | CriticalUpdates ☒ | 0 day |

306 — Patch exceptions:

Approved patches
| KB4091532, KB4088823 ... |

Approved patches compliance level
| Critical ▼ |

Rejected patches
| KB4568032, KB4725923 ... |

308 — Snapshot Management:

Generate manifest
○ Automatic
○ Manual
● Schedule

SNAPSHOT OF APPROVED PATCHES - MANAGEMENT

400 — Modifications:

| Remove | Patch ID | Description | Program |
|---|---|---|---|
| ☐ | KB4091532 | Security | Operating System |
| ☒ | KB4056982 | AppVersionUpdate | DevApplication |
| ☐ | KB43454452 | Security | Operating System |
| ☐ | KB48736022 | Service Patch | Operating System |
| ⋮ | ⋮ | ⋮ | ⋮ |

Add Patch

402 — Resource Sequence:

| Computing Resource | Order |
|---|---|
| *Select resource* ▼ <br> Resource Group A ☒ | 1 |
| *Select resource* ▼ <br> Resource Group B ☒ | 2 |

404 — Patch Sequence:

| Patch Name | Order |
|---|---|
| *Select patch* ▼ <br> KB4091532 ☒ | 1 |
| *Select patch* ▼ <br> KB4088823 ☒ | 2 |

406 — Snapshot Management:

Generate manifest
● Schedule
    [30] days

Save

IDENTIFY A FIRST GROUP OF PATCHES ASSOCIATED WITH UPDATING A COMPUTER PROGRAM INSTALLED ON A GROUP OF COMPUTING RESOURCES ASSOCIATED WITH A NETWORK-BASED SERVICE PLATFORM OF A SERVICE PROVIDER
602

↓

IDENTIFY A SET OF APPROVAL RULES FOR A USER ACCOUNT REGISTERED WITH THE NETWORK-BASED SERVICE PLATFORM, THE USER ACCOUNT BEING ASSOCIATED WITH A NETWORK-BASED SERVICE THAT IS SUPPORTED AT LEAST PARTLY BY THE GROUP OF COMPUTING RESOURCES
604

↓

EVALUATE THE SET OF APPROVAL RULES AGAINST THE FIRST GROUP OF PATCHES TO GENERATE A LIST OF A SECOND GROUP OF PATCHES THAT ARE APPROVED FOR DEPLOYMENT ON THE GROUP OF COMPUTING RESOURCES
606

↓

PROVIDE THE USER ACCOUNT WITH ACCESS TO THE LIST OF THE SECOND GROUP OF PATCHES
608

↓

RECEIVE INPUT DATA INCLUDING A REQUEST THAT OTHER PATCHES NOT INCLUDED IN THE SECOND GROUP OF PATCHES ARE NOT TO BE DEPLOYED ON THE GROUP OF COMPUTING RESOURCES DURING A PERIOD OF TIME
610

↓

DEPLOY THE SECOND GROUP OF PATCHES ON THE GROUP OF COMPUTING RESOURCES TO UPDATE THE COMPUTER PROGRAM
612

FIG. 6

CONTROLLING THE APPROVAL OF SOFTWARE UPDATES FOR COMPUTING RESOURCES

RELATED APPLICATIONS

This application claims priority to and is a continuation of U.S. patent application Ser. No. 16/271,360, filed on Feb. 8, 2019, which is a continuation of U.S. patent application Ser. No. 15/989,686, filed on May 25, 2018, the entire contents of which are incorporated herein by reference.

BACKGROUND

Service providers offer network-based services to fulfill users' computing-service needs without the users having to invest in and maintain computing infrastructure required to implement the services. These service providers may provide network-based computing resources and functionality to implement various types of services, such as scalable-storage services, computer-processing services, application-platform services, and so forth. To provide the functionality of the services, the computing resources may have various types of computer programs executing thereon, such as operating systems, applications, and so forth. Overtime, these computer programs require modifications, such as updates in the form of patches, to fix security vulnerabilities, remedy software bugs, improve visibility and performance, and so forth. For example, service providers receive operating-system patches from the operating-system providers, application patches from application developers, etc., to update the computer programs executing on the computing resources.

However, depending on the types of patches deployed on the computing resources, the timing of when the patches are deployed, and/or other factors, users that have their computing-service needs fulfilled by the service providers may experience inconsistencies among their computing resources as the patches are deployed.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2B illustrates a system-architecture diagram of an example environment in which a network-based service platform receives input from a user that modifies a list of approved patches, receives additional input that specifies that no other patches are approved other than those in the list for a period of time, and deploys the patches to computing resources that support a network-based service.

FIG. 3 illustrates a graphical user interface by which a user can create a set of approval rules for a patch baseline that specifies criteria to allow and/or disallow patches from being deployed to computing resources of a network-based service.

FIG. 4 illustrates a graphical user interface by which a user can modify a snapshot of approved patches, and specify a period of time to deploy the snapshot of patches to computing resources of a network-based service.

FIG. 6 illustrates a flow diagram of another example method for receiving patches to update computing programs, evaluating the patches against a set of approval rules to generate a list of approved patches, providing a user account with access to the list of approved patches, and refraining from deploying other patches than the list of approved patches for a period of time.

DETAILED DESCRIPTION

Figure 1:
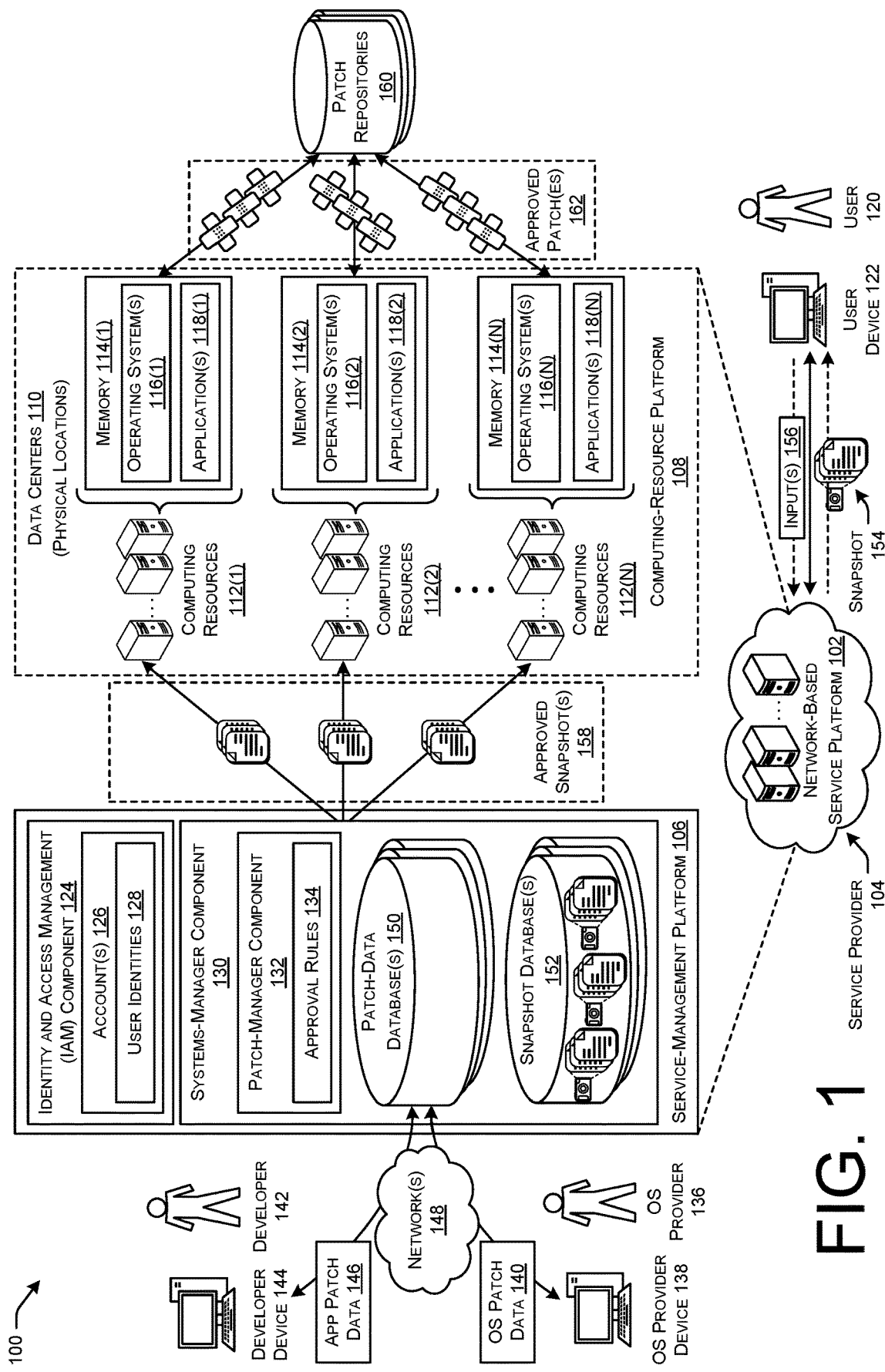
FIG. 1 illustrates a system-architecture diagram of an example environment in which a user manages a network-based service provisioned in a network-based service platform by controlling the deployment of patches to computing resources that support the network-based service.

Service providers offer various network-based services to users to fulfill computing needs of the users. These service providers may operate clusters of managed servers stored in data centers located across large geographic areas. In this way, users of the network-based services do not need to invest in and maintain the computing infrastructure required to implement the various services that they may need. Additionally, users are able to access, or provide to their clients, these network-based services over large geographic areas. To offer these network-based services across difference geographic areas, service providers operate and maintain network-based platforms (e.g., cloud-based computing environments, network-based service architectures, network-based service infrastructures, etc.).

Service providers may offer various types of network-based services, such as computer-processing services, scalable-storage services, managed-database services, application-hosting services, and/or other services. These network-based services are supported by computing resources (e.g., CPU, memory, storage, network capacity, etc.) that have various computing programs installed and executing thereon in order to provide desired functionality for the users. Overtime, computing programs require modifications, such as updates in the form of patches, to fix security vulnerabilities, remedy software bugs, improve visibility and performance, and so forth. For example, service providers receive operating-system patches from the operating-system providers, application patches from application developers, etc., to update the computer programs executing on the computing resources.

In some examples, deploying groups of patches to modify computing programs on computing resources may result in undesirable outcomes. For instance, patches may be deployed to computing resources to update operating systems for those computing resources in such a way that application(s) hosted on the computing resources may experience issues, such as compatibility issues, performance issues, etc. Further, users may desire to update their applications on the computing resources over a period of time, and the users may desire to ensure that all the computing resources in their network-based service platform are in a same patched state.

This disclosure describes, at least in part, techniques and technologies for providing and improving the control that users of network-based services have when approving and/or deploying software updates to computing resources that support their computing-service needs. In some examples, the techniques described herein include generating and using a "snapshot" of approved patches, or a list of approved patches, for a period of time, and refraining from deploying patches that are not included in that list for the period of time. For that period of time, only patches included in the snapshot may be deployed to the computing resources that support a user's network-based service. Additionally, the techniques described herein may include providing users with access to the snapshot of approved patches in order to modify the snapshot of patches before the patches are deployed. For instance, a user may be provided more control over the deployment of patches by being permitted to modify the snapshot of patches, such as by adding patches, removing patches, specifying sequences for deploying patches, etc.

Computing resources that support network-based services have various types of computing programs executing thereon, such as operating systems, applications, firmware-based programs, and so forth. Overtime, these computing programs require patches or other software updates. For example, operating-system providers may provide operating-system patches, application developers may provide application patches, operators of the network-based service platform themselves may provide patches, and/or patches from other sources may be received or otherwise identified by the service provider and at the network-based service platform (e.g., patches are stored in one or more repositories associated with the path developer/provider).

In some examples, a service provider may provide users with access to a patch-management component that allows the users control over the types of patches that are permitted to be deployed on their computing resources. For instance, the patch-management component may allow the users to define "patch baselines" that include sets of approval rules that specify criteria for approving and/or disapproving patches, such as the types of patches (e.g., security patches, update patches, etc.), the severity/criticality of the patches, and so forth. Periodically, the set of approval rules in the patch baselines may be evaluated against patches that have been received at the network-based platform from various sources. After evaluating the patches against the approval rules, a list of approved patches may be generated. However, rather than deploying the patches included in the list without further approval from a user, the techniques described herein take a "snapshot" of approved patches and "freeze" the list of approved patches for a period of time before they are deployed to the computing resources.

During this period of time, a user that has a user account registered with the network-based service that is supported by the computing resources may be provided with access to the snapshot of approved patches. For instance, the user may log in to their user account that is registered with the network-based platform and access/view the snapshot of approved patches. The user may provide various types of input, such as approving of all of the patches included in the snapshot, adding one or more patches to the snapshot, removing one or more patches from the snapshot, specifying a sequence by which patches are to be deployed on the computing resources, and so forth. In this way, a user may be given more control as to which patches are installed on the computing resources that support their service.

Upon receiving any input from the user regarding the snapshot of patches, the final list of patches may be deployed on the computing resources. In some examples, each of the computing resources may have one or more package-manager programs executing thereon to appropriately install the patches. For instance, a Windows-based operating system may utilize a Windows Update Agent API, a Linux-based operating system may utilize RedHat Package Manager, and so forth. The package-manager program(s) may be provided with the patches, or an indication of the patches and a storage location, and appropriately manage the installation of the patches for the operating system(s). Further, a systems-management agent that is maintained by the service provider may be installed on each of the computing resources in order to install patches appropriately. In some examples, the package-manager programs, and/or other programs, may be provided with the patches, and/or determine where the patches are stored (e.g., repositories).

Thus, the techniques described herein may provide users of network-based services with more control for approving and/or deploying patches to computing resources that support their network-based services. The techniques described herein affect and improve the functioning of computing resources and devices in various ways. For instance, by defining what patches are approved for network-based services over defined periods of time, services provided using the network-based services may be improved upon. The techniques described herein may help avoid issues, such as inconsistent patching across resources and software-incompatibility problems, by allowing for more consistent patching, and thus compatibility, for computing resources across a network-based platform for a user. As a specific example, a user may desire to do a gradual, staged rollout of an application that is being hosted on the computing resources over a period of time. Using the techniques described herein, the user may ensure that all of the computing resources that support their network-based service are in a same patched state by "freezing" the approved patches for the duration of the application rollout. Further, users may remove patches that may cause incompatibility issues with other software running on the computing resources. While these are just a few examples of the technology-based improvements described herein, the techniques of this disclosure improve the functioning of computing resources that support network-based services in various ways.

While some of the techniques described herein are with reference to managing patches that are to be installed for operating systems and applications, the techniques are equally applicable to any technique for remotely managing the installation of updates to any type of computer program that operates on computing resources (e.g., software, firmware, etc.). further, the techniques are described primarily with respect to network-based, or cloud-based, resources, the techniques described herein are also applicable in local groupings of computing resources.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a user manages a network-based service provisioned in a network-based service platform 102 by controlling the deployment of patches to computing resources that support the network-based service.

As illustrated in the example environment 100, the network-based service platform 102 may comprise network-based devices and may be operated and managed by a service provider 104. The network-based service platform 102 may include a service-management platform 106 that provides a management/interaction platform and interface to users that are registered for services supported by a computing-resource platform 108. The network-based service platform 102 may further include, or otherwise be associated with, the computing-resource platform 108. The computing-resource platform 108 may include data centers 110 that each include one or more computing resources 112(1), 112(2), to 112(N) where "N" is any integer greater than 2 (referred to herein collectively as "computing resources 112"). The data centers 110 may be located across disparate geographical regions such that computing resources 112 are available to support functionality for network-based services provided via the network-based service platform 102. The data centers 110 may be provisioned in a network-based computing platform associated with the network-based service provider. Additionally, or alternatively, the data centers 110 may be on-premise data centers 110 at least partly maintained and/or managed by a customer. Even further, the data centers 110 may additionally, or alternatively, be provisioned in network-based computing platforms associated with separate network-based service providers. The computing resources 112 may include various combinations of hardware-based components, such as central processing units, memory, storage, network capacity, and/or any other type of hardware-based resource to support network-based services. In some examples, the computing resources 112 may further include respective memories 114(1)-(N) that store various firmware-based and/or software-based resources that provide the functionality of the services, such as one or more operating systems 116(1)-(N), one or more applications 118(1)-(N), and so forth. The operating system(s) 116, application(s) 118, and/or other components stored in the memories 114, may provide functionality for implementing the services provided by the service providers 104, such as scalable-storage services, computer-processing services, application-hosting services, and so forth.

To utilize the services provided by the service provider 104, users 120 may register for an account with the network-based service platform 102. For instance, users 120 may utilize a user device 122 to interact with an identity and access management (IAM) component 124 that allows the user 120 to create an account 126 with the network-based service platform 102. Generally, the IAM component 124 may enable users 120 to manage access to their network-based services and computing resources 112 securely. Using the IAM component 124, users can create and manage users and groups, and use permissions to allow and deny users 120 access to the network-based services and associated computing resources 112. Each user 120 that is permitted to interact with services associated with a particular account 126 may have a user identity 128 assigned to them. In this way, users 120 may log in with sign-in credentials to their account(s) 126, and any changes or operations performed by that user 120 is tracked for that user identity 128 for auditing purposes.

The network-based service platform 102 may further include a systems-manager component 130 to allow the users 120 to manage their network-based services that are provisioned/supported in the computing-resource platform 108. The systems-manager component 130 may comprise a unified interface that allows users 120 to centralize operational data and automate tasks across their computing resources 112. The systems-manager component 130 may reduce the time to detect and resolve operational problems in the network-based service infrastructure. The systems-manager component 130 may give users 120 a complete view of network-based service performance and configuration, simplifies resource and application management, and simplifies operating and managing the network-based service at scale.

Along with other components, the systems-manager component 130 may include a patch-manager component 132 which helps users 120 to manage their patching process, including defining the patches users 120 want to approve for deployment, the timing for patch roll-outs, and determining patch compliance status across the user's 120 entire fleet of resources 112. Users 120 may utilize the patch-manager component 132 to define approval rules 134 for patches that allow or disallow patches from being deployed on the computing resources 112 that support that user's network-based service.

In some examples, the network-based service platform 102 may receive or otherwise identify patches from various sources. For example, an operating system (OS) provider (e.g., Windows, Linux, etc.) may provide, from an OS provider device 138, OS patch data 140. The OS patch data 140 may comprise various types of data, such as metadata, associated with patches provided by the OS provider 136. For instance, the OS patch data 140 may comprise names or IDs for patches, locations (e.g., repositories) where the patches are stored, version numbers for the patches, and/or any other type of data 140 that may be associated with an OS patch. The OS patch data 140 may be associated with various types of patches that are configured to update the operating systems 116, such as security-update patches, bug-repair patches, OS performance patches, and any other type of patch. Similarly, developers 142 may utilize a developer device 144 to supply application patch data 146, such as metadata, associated with patches provided by the developer 142. For instance, the app patch data 146 may comprise names or IDs for patches, locations (e.g., repositories) where the patches are stored, version numbers for the patches, and/or any other type of data 140 that may be associated with an application patch. However, patch data may be received from any other entity, and be associated with patches to update and/or modify any computing program that can execute on a computing device (e.g., software program, firmware program, etc.). The OS provider device 138 and the developer device 144 may provide the data 140/146 over one or more network(s) 148 (e.g., WANs, PANs, LANs, etc.). The network(s) 148 may comprise any type of network or combination of network, including wired and/or wireless networks.

The systems-manager component 130 may store the patch data in one or more patch-data databases 150. The patch-data database(s) 150 may comprise any type of database, and in some examples, may additionally or alternatively store patches, in which cause the patch-data including various types of repositories depending on the types of the operating systems 116. Periodically, or upon scheduled times, the patch-manager component 132 may evaluate the patches indicated by that patch data stored in the patch-data database(s) 150 against the approval rules 134 that are defined for the different users 120. For instance, each account 126 and/or user identity 128 may be associated with a separate set of approval rules 134 (also referred to herein as "patch baselines"). Thus, for a specific network-based service that is associated with a particular account 126, the patch-manager component 132 may identify approval rules 134 for that account 126. The patch-manager component 132 may then evaluate the patch data 140/146 for patches that is stored in the patch database(s) 150 against those approval rules 134. Evaluating the approval rules 134 against the patch data 140/146 may include determining whether each of the corresponding patches are approved for deployment by an approval rule 134, and/or disapproved for deployment by an approval rule 134.

Generally, the approval rules 134 may define criteria for types of patches that are allowed, or disallowed, from being deployed to computing resources 112 associated with the respective account 126. In some examples, patches may be approved and/or disapproved based on the types of patches. For instance, security patches may be always approved by the approval rules 134. In some examples, patches may be approved based on a severity or importance of the patches. For instance, the approval rules 134 may specify that patches with a severity of "critical" are always approved for deployment. Even further, the approval rules 134 may specify specifically allowed and/or disallowed patches. The user 120 may have defined specific patches that should never be allowed to be deployed to the computing resources 112, and define specific patches that should always be allowed to be deployed to the computing resources 112.

Once the approval rules 134 have been evaluated against the patch data 140/146, which correspond to patches, that is stored in the patch database(s) 150, the patch-manager component 132 may generate a list of the approved patches, or a "snapshot" of the approved patches that are permitted by the approval rules 134 for deployment. Traditionally, these patches may have been automatically deployed without receiving further input from a user 120. However, according to the techniques described herein, the snapshot of the approved patches, or the list of approved patches, may be generated and stored in one or more snapshot databases 152. Thus, the patch-manager component 132 may first evaluate the approval rules 134 included in a patch baseline to generate the list, or snapshot, of approved patches for deployment. Then, the patch-manager component 132 may store the snapshot/list in the snapshot database(s) 152 prior to deployment of the patches.

After the snapshot is stored in the snapshot database(s) 152, the network-based service platform 102 may provide access to the user 120 to a snapshot 154 that was generated for the account 126 of the user 120. For instance, the user 120 may utilize their user device 122 to log into their account 126 via their sign-in credentials and view the snapshot 154. The patch-manager component 132 may further provide the user 120 with the ability to modify, or provide other input 156, to control the deployment of the patches included in the snapshot 154. The user may be able to add patches to the snapshot 154, remove patches from the snapshot 154, specify a sequence, or order, of computing resources 112 on which the patches are to be deployed, and/or other input 156. The patch-manager component 132 may receive the input 156 from the user 120 via their account 126 and modify and/or implement the snapshot 154 accordingly. In some examples, the user 120 may simply approve of the snapshot 154. In further examples, the user 120 may have specified an option that if the user 120 has not provided feedback on the snapshot 154 within a specified period of time (e.g., 1 day, 1 week, 1 month, etc.), the patch-manager component 132 is to approve of the snapshot 154.

In various examples, the user 120 may further provide input 156 indicating a period of time during which only the patches in the approved/modified snapshot 154 are to be deployed. Stated otherwise, the patches included in the snapshot 154 may be the only patches that are allowed or permitted to be deployed to the computing resources 112 for a period of time. In various examples, the user may manually request a snapshot 154 to be created, and in other examples, the user 120 may schedule a regular generation/creation of a snapshot 154. In this way, the user 120 may "freeze" or otherwise define which patches will be deployed to their computing resources 112 over a period of time. In doing so, the user 120 will not be surprised or otherwise unaware of patches being installed on their computing resources 112 that support their network-based services.

Once the patch-manager component 132 has received approval and/or the final input 156 from the user 120 via the account 126, the patch-manager component 132 may provide one or more approved snapshots 158 from the approved and/or modified snapshot 154 according to the preferences and/or input 156 of the user 120. In some examples, the patch-manager component 132 may simply provide an indication of the list of approved patches in the snapshot 154 to the computing resources, and patch-installation components that are built-in or otherwise executing on the computing resources 112 may install the patches accordingly. For instance, the computing resources 112 may already have software components configured to install patches in an appropriate manner.

In some examples, the operating systems 116 and/or the applications 118 may each have patch-installation components that are able to identify one or more patch repositories 160 where the approved patches 162 are stored, and other software-installation components (e.g., high-privilege agents) operating on the computing resources 112 may install the approved patches accordingly. The patch-installation components may receive, and/or fetch, the approved patch(es) 162 from the patch repositories 160. In some examples, the patch repositories 160 may be managed by one or more of the service provider 104, by the OS provider 136, the developer 142, and/or any other entity. Further, the patch-management component 132 may instruct the patch-installation components executing on the computing resources 112 to install the patches according to the sequence/order that the user 120 specified. Thus, to deploy the approved patches 162, the service-management platform 106 may, in some examples, provide the actual patches 162 to each of the computing resources 112, may provide indications of the patch IDs and/or storage locations in the snapshot database(s) 152 to allow the installation components to access the patches, and/or utilize any other method for deploying the approved patches 162 to the computing resources 112.

Figure 2A:
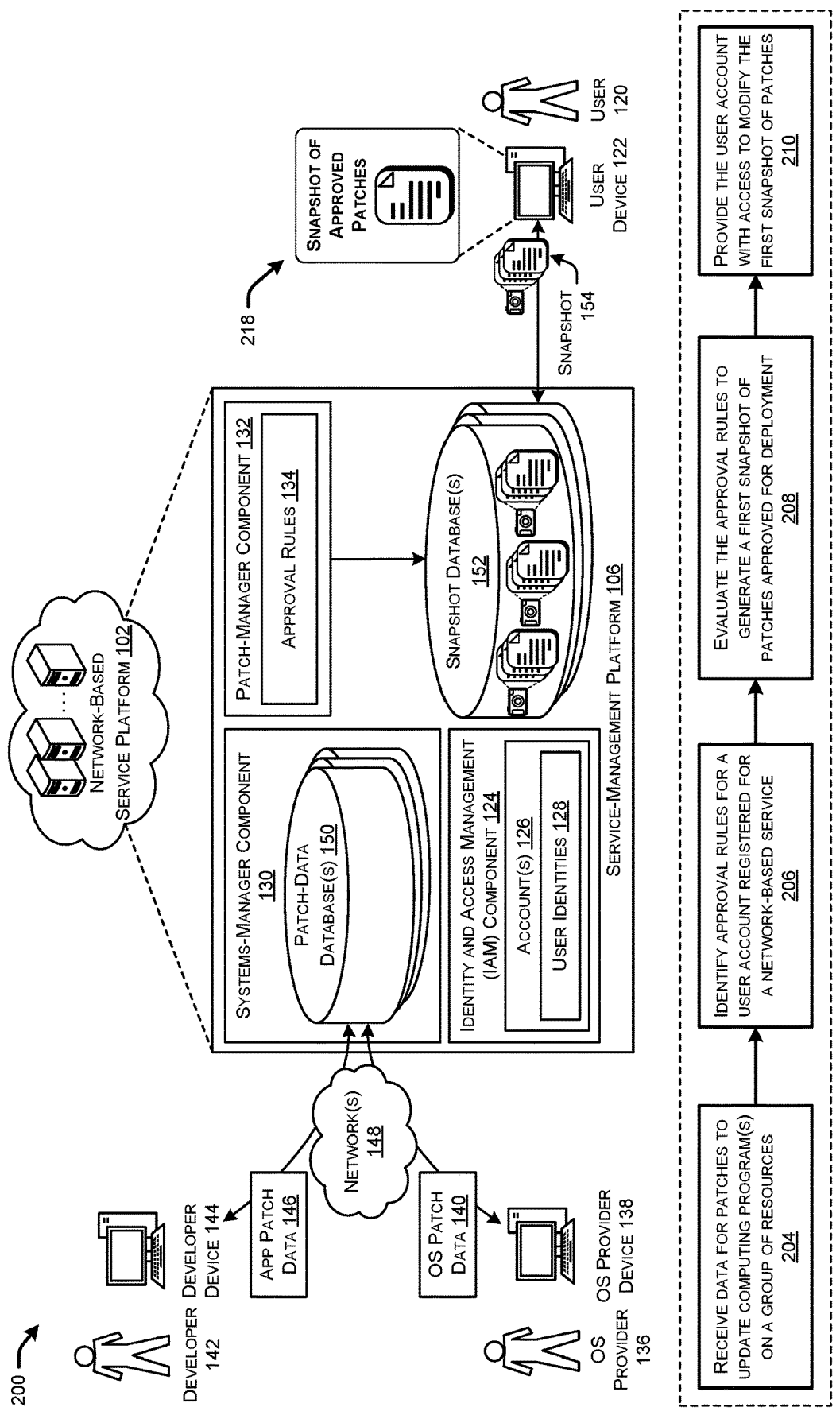
FIG. 2A illustrates a system-architecture diagram of an example environment in which a network-based service platform receives patches to update computing programs installed on computing resources of a network-based service, evaluates the patches against a set of approval rules to generate a list of approved patches, and provides a user account with access to modify the list of approved patches.

FIG. 2A illustrates a system-architecture diagram of an example environment 200 in which a network-based service platform receives patches to update computing programs installed on computing resources of a network-based service, evaluates the patches against a set of approval rules to generate a list of approved patches, and provides a user account with access to modify the list of approved patches.

The environment 200 illustrates an example process 202 of operations that are performed by different entities in the environment 200. At 204 of the example process 202, the network-based service platform 102 may receive, at the service-management platform 106, patch-data 140 and/or 146 for patches to update computing program(s) on a group of resources 112. For instance, an OS provider 136 may sent OS patch data 140 over the network(s) 148 to the service-management platform 106, an application developer 142 may send application patch data 146 over the network(s) 148, and so forth. The systems-manager component 130 may then store the received patch data 140/146 in one or more patch-data databases 150.

At 206, the systems-manager component 130 may identify approval rules 134 for a user account 126 registered with the network-based service platform 102. For example, the systems-manager component 130 may determine that a user 120 has created an account 126 with the service-management platform 106, and further determine that the user 120 has a network-based service that is supported by computing resources 112 in the computing-resource environment 108. The systems-manager component 130 may notify the patch-manager component 132 of the user account 126, and the patch manager-component 132 may determine approval rules 134 that have been specified for that account 126. The approval rules 134 may comprise criteria specifying how to approve and/or disapprove patches from being deployed on the computing resources 112. For instance, the approval rules 134 may include criteria such as severity levels of patches that are approved/disapproved for deployment (e.g., "critical" patches are always deployed, "optional" patches are never deployed, etc.). Further, the approval rules 134 may indicate that patches for certain computing programs are always approved (e.g., OS patches for the OS systems 116 are always approved, application patches are approved based on severity, etc.). These are merely examples, and any type of set of approval rules 134 may be defined.

At 208, the patch-manager component 132 may evaluate the approval rules 134 against the patches to generate a first snapshot 154 of the patches approved for deployment. The approval rules 134 may remove patches that did not "pass" or qualify for deployment on the resources 112 based on the approval rules 134. The snapshot 154 may comprise a list of patches (e.g., a list of patch identifiers), and potentially other information. For instance, a snapshot 154 may further include brief descriptions of what programs the patches are updating, what types of updates are in the patches, and so forth.

At 210, the network-based service platform 102 may provide the user account 126 with access to modify the first snapshot 154 of the approved patches. For example, the user 120 may use their user device 122 to log into the user account 126 to approve the snapshot 154, and/or modify the snapshot. In some examples, the network-based service platform 102 may provide the snapshot 154 to the user device 122 using other means, such as email.

FIG. 2B illustrates a system-architecture diagram of the example environment 200 in which a network-based service platform 102 receives input from a user 120 that modifies a list of approved patches, receives additional input that specifies that no other patches are approved other than those in the list for a period of time, and deploys the patches to computing resources that support a network-based service.

The process 202 is continued in FIG. 2B, and proceeds to 212 where the network-based service platform 102 receives first input 156 that modifies the first snapshot 154 to result in a second snapshot 212 (e.g., approved snapshot(s) 158). In some examples, modifying the snapshot 154 may include removing a patch, adding a patch, defining timing for deploying the patches, defining computing resources 112 to which the patches are to be deployed, and so forth. The user 120 may provide the input via a user interface 218 that shows a snapshot of the approved patches. The modified, second snapshot may include a list of patches that is at least partly different than the first snapshot (e.g., more patches, less patches, etc.).

At 214, the network-based service platform 102 receives second input that specifies a period of time during which patches not in the second snapshot are not permitted to be deployed. The user 120 may provide second input that indicates the second snapshot of patches are to be "frozen" on the computing resources 112, which means that for a period of time, no other patches are to be deployed to the computing resources 112 if they are not included in the second snapshot 154. In this way, the user 120 knows that the computing resources 112 supporting their network-based service are in a same, consistent patched state for the period of time. Additional patches received during the period of time may be stored in the patch database(s) 150 until a new snapshot 154 is generated.

At 216, the service-management platform 106 may deploy the approved patches 162 in the second snapshot 158 on the group of computing resources 112 to update the computing program (e.g., operating system(s) 116, application(s) 118, etc.). The approved patches 162 from the second snapshot 158 may be deployed on the computing resources 112 based on input received from the user 120. For instance, the user 120 may have specified that multiple patches are to be deployed on the computing resources 112 according to a sequence or order. Further, the user 120 may have specified that the approved patches 162 are to be deployed to specific computing resources 112, and/or groupings of computing resources 112, in a particular order or sequence. The approved patches 162 may be deployed to the computing resources 112 during a period of time according to the input of the user 120. In some examples, deploying the patches 162 may comprise instructing the computing resources 112 to retrieve the patches from the patch repositories 160. For instance, the systems-manager component 130 may send an indication of the approved snapshot 158 including indications (e.g., patch IDs, storage locations, etc.) of the approved patches 162, and the software executing on the computing resources 112 may retrieve, receive, or otherwise obtain the approved patches 162 from the patch repositories 160, or potentially other locations (e.g., stored in a database associated with the network-based service platform 102).

FIG. 3 illustrates a graphical user interface (UI) 300 by which a user 120 can create a set of approval rules 134 for a patch baseline that specifies criteria to allow and/or disallow patches from being deployed to computing resources 112 of a network-based service.

As illustrated, the UI 300 may include a patch-baseline details interface 302 by which the user 120 may define details for this specific patch baseline. The patch-baseline details interface 302 may allow the user 120 to define a name for the patch baseline, a description for the patch baseline, and a computer program to which the particular patch baseline applies. In the specific example, the patch-baseline details interface 302 illustrates that this patch baseline is to be utilized to allow and/or disallow patches for operating systems 116 on the computing resources 112. Thus, a patch baseline may be specific to particular computing programs, and in other examples, the patch baselines may apply the approval rules 134 for all programs on the resources 112.

The UI 300 further includes an approval-rules interface 304 by which a user 120 may specify the sets of approval rules 134 for the patch baseline. The approval-rules interface 304 may provide the user 120 with options to select the products (e.g., operating systems, applications, etc.) to which the particular rules apply, and define types of patches that are approved for deployment. Further, the approval-rules interface 304 may allow the user 120 to define a classification of the types of patches that are applicable for the product. As illustrated, the user 120 may define rules for security update patches (e.g., types of patches), critical update patches (e.g., severity of patches), and so forth. Further, the approval-rules interface 304 allows the user 120 to define rules for approving the different classifications of patches. For instance, security update patches may be automatically approved four days after receiving them, and critical updates may be automatically approved right when they are received.

The UI 300 may further include a patch-exceptions interface 306 that illustrates to a user 120 which patches were approved based on the rules 134, and which patches were rejected. For instance, the patch-exceptions interface 306 may show patch IDs for approved patches, and patch IDs for rejected patches. The patch-exceptions interface 306 may allow the user 120 modify which approved/rejected patches are presented based on their compliance level (e.g., critical, optional, unspecified, etc.).

The UI 300 may further include a snapshot-management interface 308 by which a user 120 may provide input indicating that they would like to generate a snapshot of patches for a period of time. Rather than simply having the approval rules 134 in the patch baseline automatically be evaluated against patches as they are received, or periodically without input from the user 120, the user may provide input via the snapshot-management interface 308 indicating that they would like snapshots created prior to deploying approved patches, and also indicate how they would like the snapshots generated. The user 120 may indicate an "automatic" option meaning that snapshots are generated any time the patch baseline is evaluated against patches. Further, the user 120 may indicate a "manual" option where a snapshot is only generated if the user 120 manually requests the snapshot, and otherwise the patch baseline is evaluated without generating and freezing a snapshot. The user 120 may also indicate, via the snapshot-management interface 308, that they would like snapshots generated according to a schedule.

FIG. 4 illustrates a graphical user interface (UI) 218 by which a user can modify a snapshot of approved patches, and specify a period of time to deploy the snapshot of patches to computing resources of a network-based service. The user 120 may be able to access the UIs 300 and 218 via their account 126 registered with the network-based service platform 102. Further, the changes made by the user 120 via the UIs 300 and 218 may be tracked and stored (e.g., cloud trails for auditing) with an association of the user identity 128 that made the changes.

The UI 218 may include portions or controls to allow the user 120 to provide input. The UI 218 may include a modifications interface 400 by which the user 120 may make changes to the patches that were approved for deployment after being evaluated against the set of approval rules 134. As illustrated, the user 120 may utilize the modifications interface 400 to select patches they wish to remove, and also select an "add patch" option. In this way, the user 120 may add or remove patches from their snapshot of approved patches prior to the patches being deployed on the computing resources 112.

The UI 218 may further include a resource-sequence interface 402 by which the user 120 may specify a sequence, or order, in which patches are to be deployed. The user 120 may utilize the resource-sequence interface 402 to provide different types of sequences or orders. For instance, the user 120 may provide input via the resource-sequence interface 402 to indicate that the approved patches 162 are to be deployed to a first resource, or a first resource group A, before the approved patches 162 are to be deployed to a second resource, or a second resource group B. In this way, the resource-sequence interface 402 allows a user 120 to define which computing resources 112 the approved patches 162 should be deployed on according to an order or sequence.

The UI 218 may further include a patch-sequence interface 404 that allows a user 120 to provide input that specifies an order in which the approved patches 162 are to be deployed on the computing resources 112. In the illustrated example, the patch-sequence interface 404 allows the user 120 to specify a particular patch (or a group of patches) that is to be deployed to the computing resources 112 first in time, and specify another patch (or another group of patches) that are to be deployed to the computing resources 112 second in time. In this way, the user 120 may utilize the patch-sequence interface 404 to define orders in which the patches are to be deployed on the computing resources 112.

Further, the UI 218 may include a snapshot-management interface 406 that allows the user 120 to provide input specifying timing for how the snapshots are to be generated. For instance, if the user 120 requested "scheduled" generated of snapshots, the snapshot-management interface 406 allows the user 120 to provide input indicating the number of days between generating new snapshots. In this way, the user 120 may provide input via the snapshot-management interface 406 to specify how long snapshots of patches are to be "frozen" on the computing resources 112 before new patches are approved to be deployed onto the computing resources 112.

Figure 5:
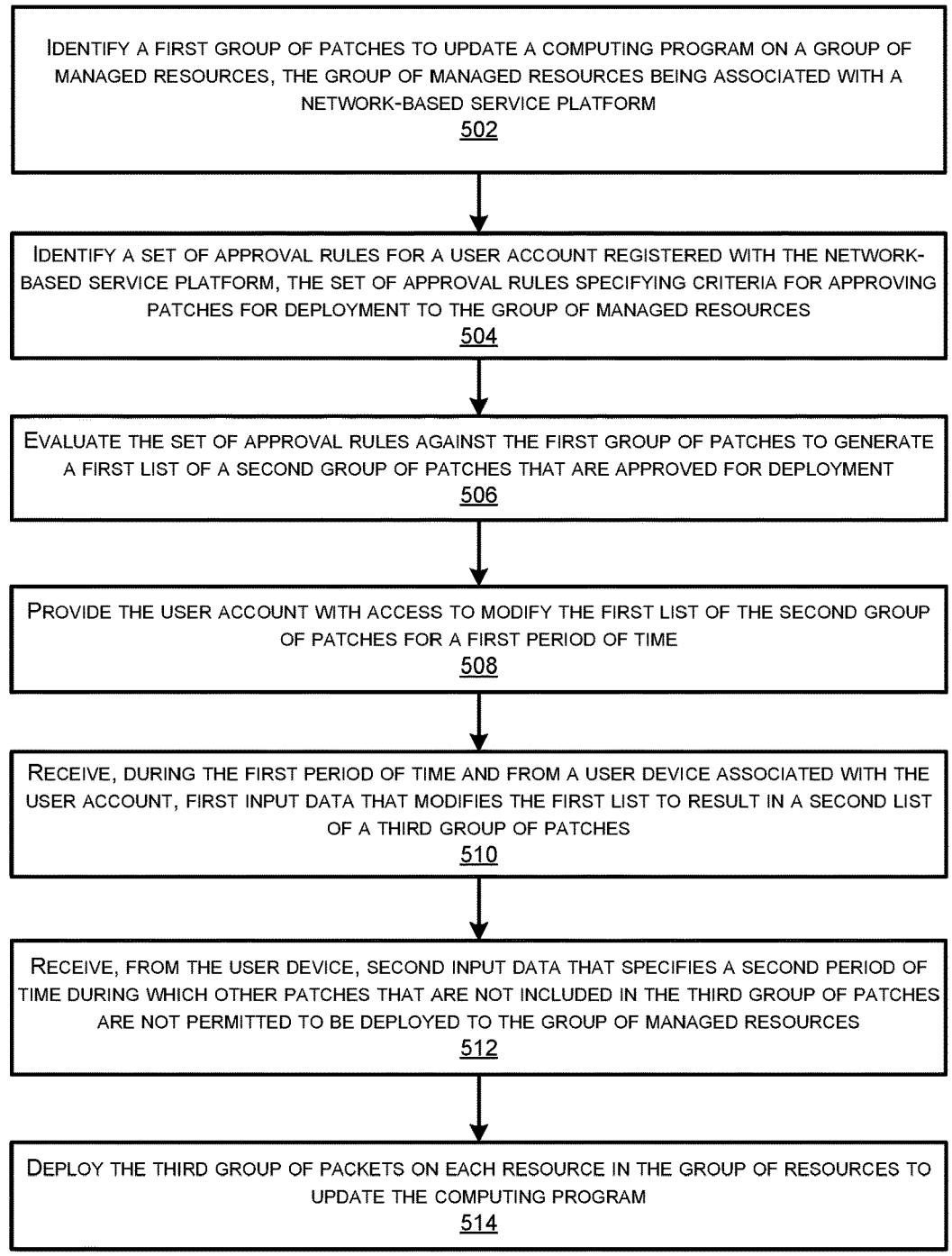
FIG. 5 illustrates a flow diagram of an example method for receiving patches to update computing programs, evaluating the patches against a set of approval rules to generate a list of approved patches, providing a user account with access to modify the list of approved patches, and refraining from deploying other patches than the list of approved patches for a period of time.
Figure 7:
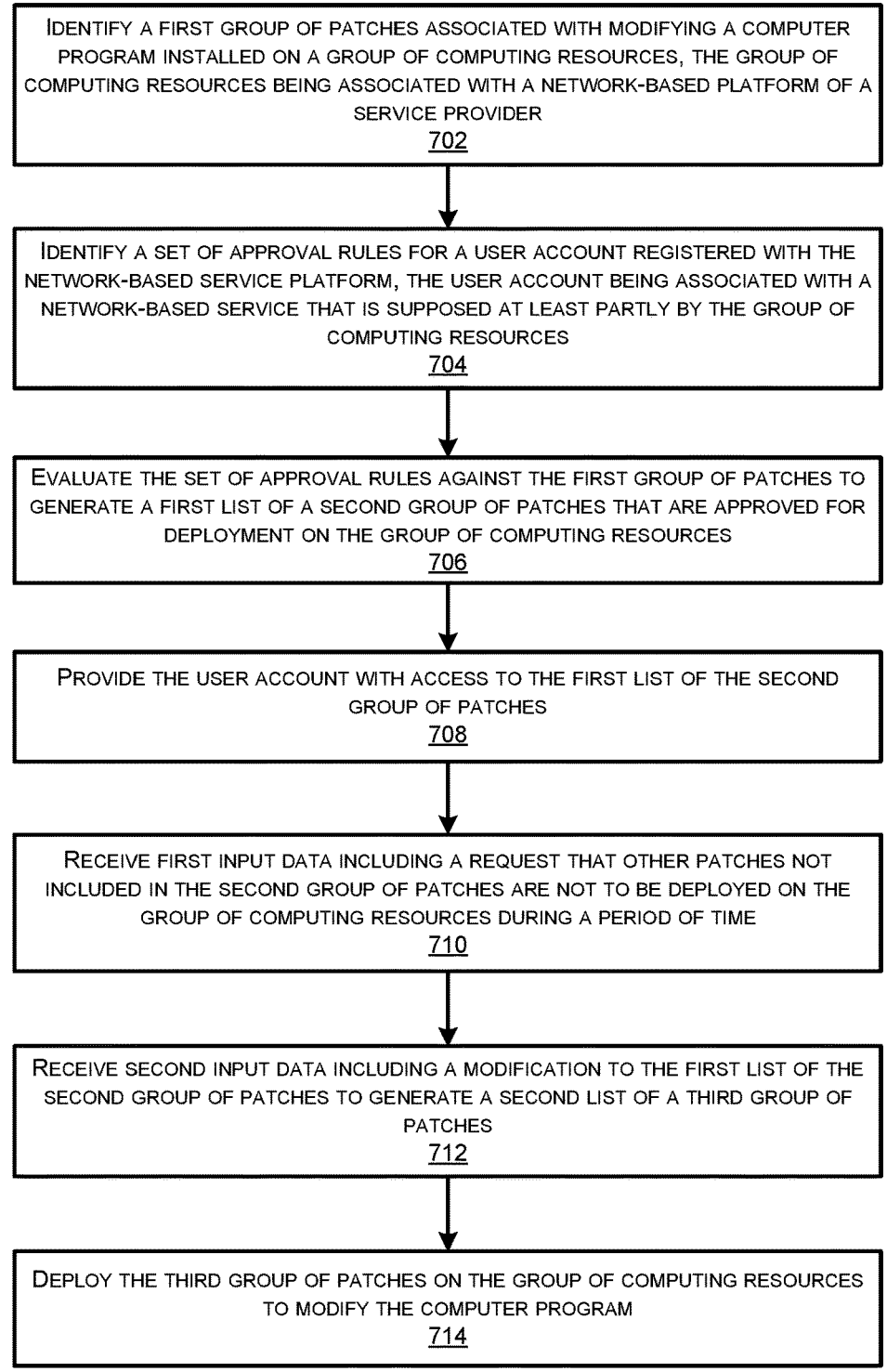
FIG. 7 illustrates a flow diagram of another example method for receiving patches to update computing programs, evaluating the patches against a set of approval rules to generate a list of approved patches, providing a user account with access to modify the list of approved patches, and refraining from deploying other patches than the list of approved patches for a period of time.

FIGS. 5-7 illustrate flow diagrams of example methods 500, 600, and 700 that illustrate aspects of the functions performed at least partly by the network-based service platform 102 as described in FIGS. 1-4. The logical operations described herein with respect to FIGS. 5, 6, and 7 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5-7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 5 illustrates a flow diagram of an example method 500 for receiving patches to update computing programs, evaluating the patches against a set of approval rules to generate a list of approved patches, providing a user account with access to modify the list of approved patches, and refraining from deploying other patches than the list of approved patches for a period of time.

At 502, a network-based service platform 102 may identify a first group of patches to update a computer program on a group of managed resources 112. The group of managed resources 112 may be provisioned in the network-based service platform 102 as part of a network-based service. In some examples, the group of managed resources 112 may be on-premise of the user 120, and/or in another network-based service platform 102. The patches may be stored in one or more repository databases.

At 504, the network-based service platform 102 may identify a set of approval rules 134 for a user account 126 registered with the network-based service. In some examples, the set of approval rules 134 may specify criteria for approving patches for deployment on the group of managed resources 112.

At 506, the network-based service platform 102 may evaluate the set of approval rules 134 against the first group of patches to generate a first list of a second group of patches (e.g., snapshot) that are approved for deployment. The set of approval rules 134 may remove patches from the first group of patches when generating the first list of the second group of patches.

At 508, the network-based service platform 102 may, prior to deploying the second group of patches on the group of managed resources 112, provide the user account 126 with access to modify the first list of the second group of patches for a first period of time. For example, the user 120 may be provide with a first period of time (e.g., a day, a week, etc.) to in which the user 120 may log into their account 126 to modify the first list of the second group of patches.

At 510, the network-based service platform 102 may, prior to deploying the second group of patches on the group of managed resources 112, receive, during the first period of time and from a user device 122 associated with the user account 126, first input data that modifies the first list to result in a second list of a third group of patches. In some examples, the first input data comprises at least one of a first request to add a first patch to the second group of patches, or a second request to remove a second patch from the second group of patches.

At 512, the network-based service platform 102 may receive, from the user device 122, second input data that specifies a second period of time during which other patches that are not included in the third group of patches are not permitted to be deployed to the group of managed resources. For example, the second input data may indicate that the user 120 would like the third group of patches to be the only patches installed on the computing resources 112 for the second period of time (e.g., a week, a month, etc.).

At 514, the network-based service platform 102 may deploy the third group of patches (e.g., approved patches 162) on the group of managed resources to update the computer program (e.g., operating system(s) 116, application(s) 118, etc.).

The method 500 may further comprise receiving, at the network-based service platform 102 and from the user device 122, third input data that specifies a sequence by which multiple patches in the third group of patches are to be deployed on the group of managed resources. In such examples, deploying the third group of patches may include deploying the multiple patches on the group of managed resources in an order specified by the sequence.

In some examples, the method 500 further comprises receiving, at the network-based service platform 102, a third patch to update the computer program during the second period of time, and storing the third patch in a database associated with the system (e.g., patch database(s) 150). Further, the network-based service platform 102 may detect an end of the second period of time, and subsequent to the end of the second period of time, the network-based service platform 102 may evaluate the set of approval rules 134 against the third patch to approve the third patch for deployment, and deploy the third patch on the group of managed resources 112.

In some examples, prior to providing the user account 126 with the access to modify the first list of the second group of patches, the method 500 may further comprise at least one of receiving, from the user device, third input data comprising a manual request to provide the user account with the access to modify the first list of the second group of patches, or receiving, from the user device, fourth input data comprising a predefined schedule at which the user account is to be provided with the access to modify lists of approved patches. In such examples, providing the user account with the access to modify the first list may be performed at least partly responsive to at least one of receiving the third input data or detecting a scheduled time in the predefined schedule.

FIG. 6 illustrates a flow diagram of another example method 600 for receiving patches to update computing programs, evaluating the patches against a set of approval rules to generate a list of approved patches, providing a user account with access to the list of approved patches, and refraining from deploying other patches than the list of approved patches for a period of time.

At 602, one or more network-based devices (e.g., network-based service platform 102) associated with a service provider 104 may identify a first group of patches (e.g., receive patch data 140 and/or 146). The first group of patches may be associated with updating a computer program installed on a group of computing resources that are provisioned in a network-based service platform (e.g., computing-resource platform 108) of the service provider, provisioned on-premise for a customer, and/or provisioned in another network-based service platform of another service provider.

At 604, the one or more network-based devices may identify a set of approval rules 134 for a user account 126 registered with the network-based service platform 102. The user account 126 may be associated with a network-based service that is supported at least partly by the group of computing resources 112.

At 606, the one or more network-based devices may evaluate the set of approval rules 134 against the first group of patches to generate a list of a second group of patches that are approved for deployment on the group of computing resources 112.

At 608, the one or more network-based devices may, prior to deploying the second group of patches on the group of computing resources 112, providing the user account with access to the list of the second group of patches.

At 610, the one or more network-based devices may receive, from a user computing device 122 associated with the user account 126, input data including a request to refrain from deploying other patches not included in the second group of patches on the group of computing resources during a period of time. For instance, the user computing device 122 may specify that the second group of patches are the only patches that are to be deployed to the computing resources 112 during the period of time.

At 612, the one or more network-based devices may deploy the second group of patches (e.g., approved patches 162) on the group of computing resources 112 to update the computer program.

FIG. 7 illustrates a flow diagram of another example method 700 for receiving patches to update computing programs, evaluating the patches against a set of approval rules to generate a list of approved patches, providing a user account with access to modify the list of approved patches, and refraining from deploying other patches than the list of approved patches for a period of time.

At 702, a network-based service platform 102 may identify a first group of patches associated with modifying a computer program installed on a group of computing resources 112. The group of computing resources 112 may be provisioned in a network-based service platform (e.g., computing-resource platform 108) of a service provider 104.

At 704, the network-based service platform 102 may identify a set of approval rules 134 for a user account 126 registered with the network-based service platform 102. The user account 126 may be associated with a network-based service that is supported at least partly by the group of computing resources 112.

At 706, the network-based service platform 102 may evaluate the set of approval rules 134 against the first group of patches to generate a first list of a second group of patches that are approved for deployment on the group of computing resources.

At 708, prior to deploying the second group of patches on the group of computing resources, the network-based service platform 102 may provide the user account with access to the first list of the second group of patches. Further, at 710, the network-based service platform 102 may receive, from a user device 122 associated with the user account 126, first input data including a request to refrain from deploying other patches not included in the second group of patches on the group of computing resources during a period of time.

At 712, the network-based service platform 102 may receive, from the user device 122, second input data including a modification to the first list of the second group of patches to generate a second list of a third group of patches. at 714, the network-based service platform 102 may deploy the third group of patches on the group of computing resources to modify the computer program.

Figure 8:
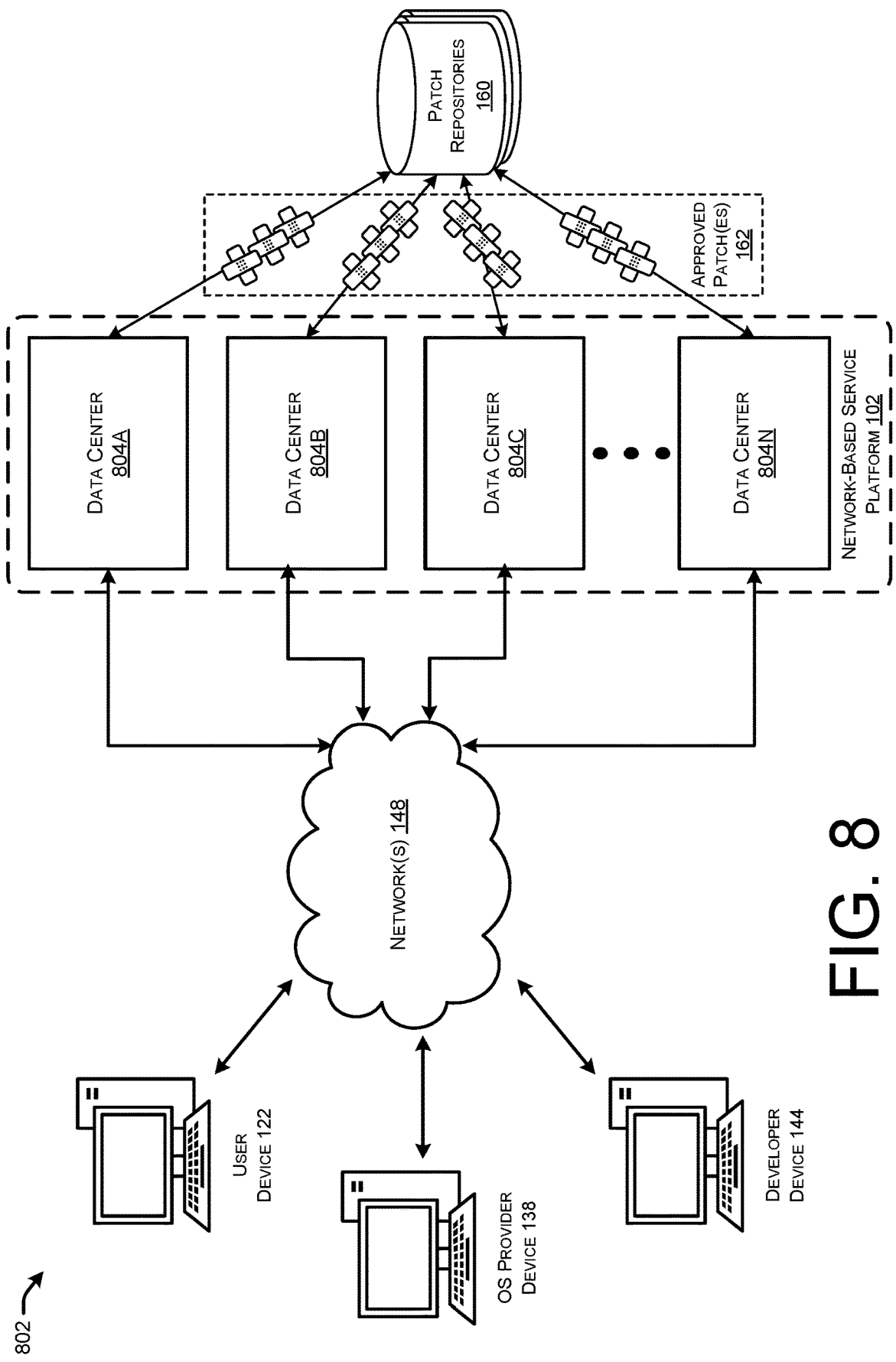
FIG. 8 is a system and network diagram that shows an illustrative operating environment that includes a service provider network that can be configured to implement aspects of the functionality described herein.

FIG. 8 is a system and network diagram that shows one illustrative operating environment 802 for the configurations disclosed herein that includes a network-based service platform 102 that can be configured to perform the techniques disclosed herein. The network-based service platform 102 can provide computing resources, like VM instances and storage, on a permanent or an as-needed basis. Among other types of functionality, the computing resources 112 provided by the network-based service platform 102 may be utilized to implement the various services described above. As also discussed above, the computing resources provided by the network-based service platform 102 can include various types of computing resources, such as data processing resources like VM instances, data storage resources, networking resources, data communication resources, network services, and the like.

Each type of computing resource provided by the network-based service platform 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The network-based service platform 102 can also be configured to provide other types of computing resources not mentioned specifically herein.

The computing resources provided by the network-based service platform 102 may be enabled in one embodiment by one or more data centers 804A-804N (which might be referred to herein singularly as "a data center 804" or in the plural as "the data centers 804"). The data centers 804 are facilities utilized to house and operate computer systems and associated components. The data centers 804 typically include redundant and backup power, communications, cooling, and security systems. The data centers 804 can also be located in geographically disparate locations. One illustrative embodiment for a data center 804 that can be utilized to implement the technologies disclosed herein will be described below with regard to FIG. 8.

The data centers 804 may be configured in different arrangements depending on the network-based service platform 102. For example, one or more data centers 804 may be included in or otherwise make-up an availability zone. Further, one or more availability zones may make-up or be included in a region. Thus, the network-based service platform 102 may comprise one or more availability zones, one or more regions, and so forth. The regions may be based on geographic areas, such as being located within a predetermined geographic perimeter.

The customers and other users 120 of the network-based service platform 102 may access the computing resources 112 provided by the network-based service platform 102 over any wired and/or wireless network(s) 148, which can be a wide area communication network ("WAN"), such as the Internet, an intranet or an Internet service provider ("ISP") network or a combination of such networks. For example, and without limitation, a user device 122 operated by a customer or other user 120 of the network-based service platform 102 may be utilized to access the network-based service platform 102 by way of the network(s) 148. It should be appreciated that a local-area network ("LAN"), the Internet, or any other networking topology known in the art that connects the data centers 804 to remote customers and other users can be utilized. It should also be appreciated that combinations of such networks can also be utilized.

As shown in FIG. 8, each of the data centers 804 may include computing devices that included software that receives the approved patches 162 from the patch repositories 160. For instance, the computing devices included in the data centers 804 may include software components which retrieve, receive, or otherwise obtain the approved patches 162 indicated in a snapshot from the patch repositories 160.

Figure 9:
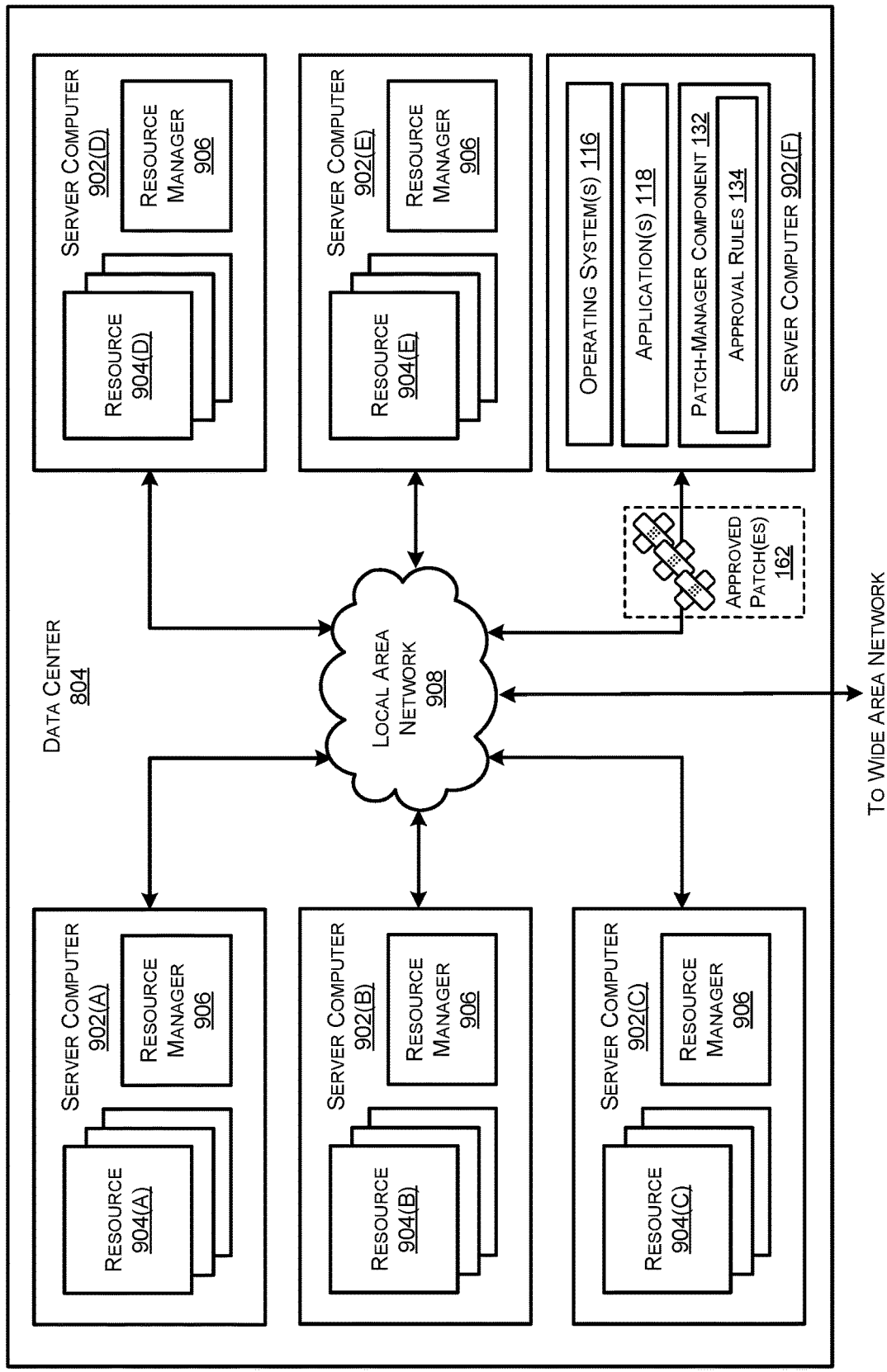
FIG. 9 is a computing system diagram illustrating a configuration for a data center that can be utilized to implement aspects of the technologies disclosed herein.

FIG. 9 is a computing system diagram that illustrates one configuration for a data center 804 that implements aspects of the technologies disclosed herein. The example data center 804 shown in FIG. 9 includes several server computers 902A-902F (which might be referred to herein singularly as "a server computer 902" or in the plural as "the server computers 902") for providing computing resources 904A-904E. In some examples, the resources 904 and/or server computers 902 may include, or correspond to, the computing resources 112 described herein.

The server computers 902 can be standard tower, rackmount, or blade server computers configured appropriately for providing the computing resources described herein (illustrated in FIG. 9 as the computing resources 904A-904E). As mentioned above, the computing resources provided by the network-based service platform 102 can be data processing resources such as VM instances or hardware computing systems, database clusters, computing clusters, storage clusters, data storage resources, database resources, networking resources, and others. Some of the servers 902 can also be configured to execute a resource manager 906 capable of instantiating and/or managing the computing resources. In the case of VM instances, for example, the resource manager 906 can be a hypervisor or another type of program configured to enable the execution of multiple VM instances on a single server computer 902. Server computers 902 in the data center 804 can also be configured to provide network services and other types of services, some of which are described in detail below with regard to FIG. 9.

The data center 804 shown in FIG. 9 also includes a server computer 902F that can execute some or all of the software components described above. For example, and without limitation, the server computer 902F can be configured to execute components of the network-based service platform 102, including the operating system(s) 116, the applications(s) 118, and/or the other software components described above. The server computer 902F can also be configured to execute other components and/or to store data for providing some or all of the functionality described herein. In this regard, it should be appreciated that the services illustrated in FIG. 9 as executing on the server computer 902F can execute on many other physical or virtual servers in the data centers 904 in various embodiments.

In the example data center 804 shown in FIG. 9, an appropriate LAN 908 is also utilized to interconnect the server computers 902A-902F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 804A-804N, between each of the server computers 902A-902F in each data center 804, and, potentially, between computing resources in each of the server computers 902. It should be appreciated that the configuration of the data center 804 described with reference to FIG. 9 is merely illustrative and that other implementations can be utilized.

As shown in FIG. 9, at least one of the server computers 902(F) may include various components to perform various functionality described herein. For example, server computer 902(F) may include an operating system 116, application(s) 118, and/or a patch-manager component 132 that includes approval rules 134. In some examples, a patch-installation component may retrieve, via the wide area network, the approved patches 162 to update or otherwise modify the operation system 116, the application(s) 118, and/or another computer program on the server computer 902(F).

Figure 10:
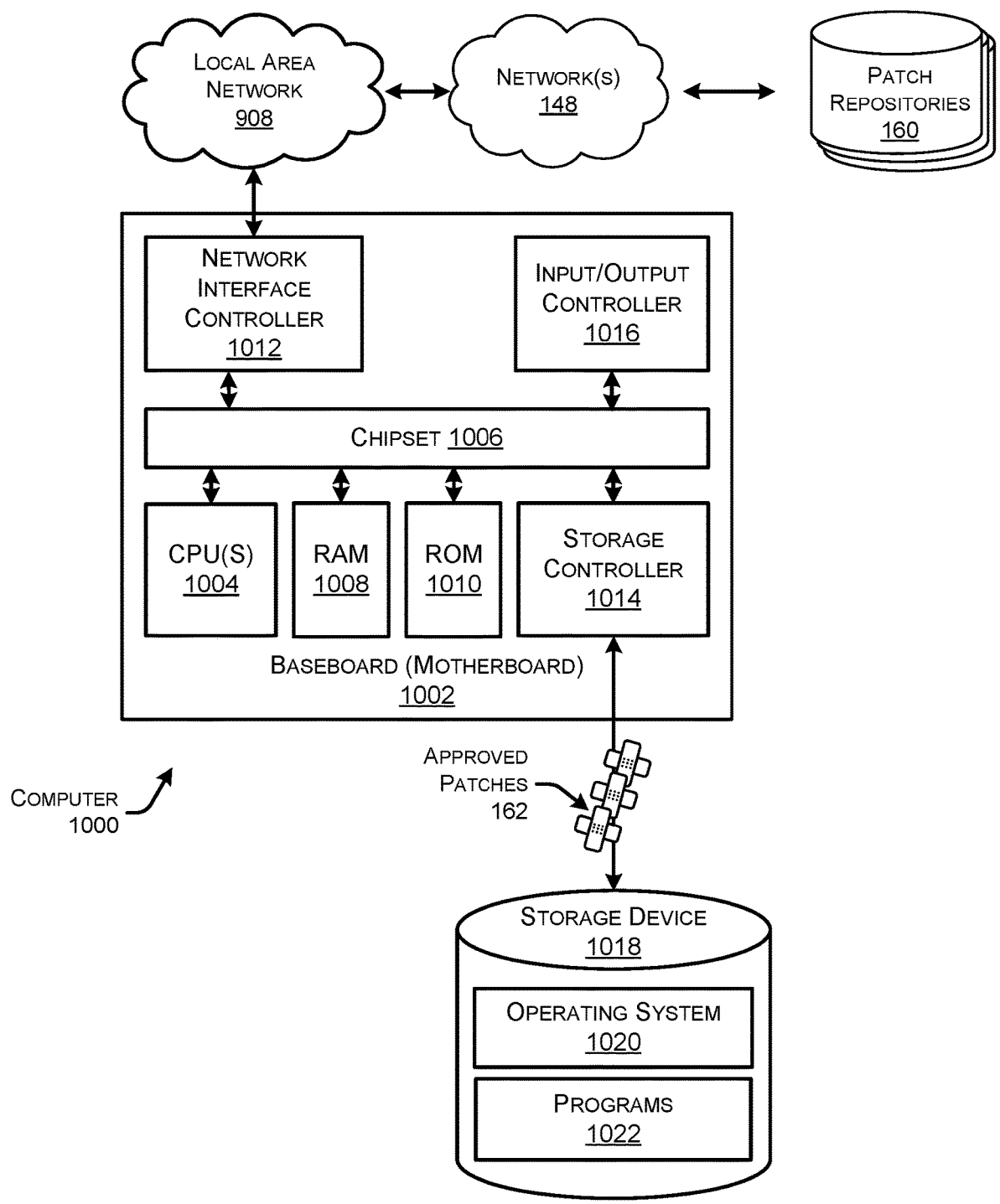
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 908. The chipset 1006 can include functionality for providing network connectivity through a NIC 1012, such as a gigabit Ethernet adapter. The NIC 1012 is capable of connecting the computer 1000 to other computing devices over the network 908 (or 148). It should be appreciated that multiple NICs 1012 can be present in the computer 1000, connecting the computer to other types of networks and remote computer systems.

The computer 1000 can be connected to a mass storage device 1018 that provides non-volatile storage for the computer. The mass storage device 1018 can store an operating system 1020 (e.g., operating systems 116(1)-(N)), programs 1022 (e.g., applications 118, agents, etc.), and data, which have been described in greater detail herein. The mass storage device 1018 can be connected to the computer 1000 through a storage controller 1014 connected to the chipset 1006. The mass storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1018 is characterized as primary or secondary storage, and the like.

For example, the computer 1000 can store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1018 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the network-based service platform 102, and or any components included therein, may be supported by one or more devices similar to computer 1000. Stated otherwise, some or all of the operations performed by the network-based service platform 102, and or any components included therein, may be performed by one or more computer devices 1000 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1018 can store an operating system 1020 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1018 can store other system or application programs and data utilized by the computer 1000.

In one embodiment, the mass storage device 1018 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 1-7. The computer 1000 can also include computer-readable storage media having instructions stored thereupon for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or might utilize an architecture completely different than that shown in FIG. 10.

As shown in FIG. 10, the computer 1000 may receive, retrieve, or otherwise obtain the approved patches 162 from the patch repositories 160. The computer 1000 may then install the approved patches 162 on the operating system 1020 and/or the programs 1022 that are stored in the storage device 1018 to update or otherwise modify the operating system 1020 and/or the programs 1022 (e.g., application(s) 118).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

running, in a cloud provider network, one or more applications on virtual machines (VMs) on behalf of a user account registered with the cloud provider network;

identifying first operating system (OS) patches associated with an operating system installed on the VMs;
receiving, from the user account, first input data indicating a predefined schedule according to which received OS patches are to be automatically installed on the VMs for the user account;
determining, based at least in part on the predefined schedule, to refrain from deploying the first OS patches on the VMs for a period of time;
receiving, from the user account, an approval rule that indicates at least one of:
an approved OS patch that is approved to be installed on the VMs of the user account; or
a denied OS patch that is disallowed from being installed on the VMs of the user account;
evaluating the approval rule against individual ones of the first OS patches to identify one or more second OS patches that are approved for deployment on the VMs;
based at least in part on detecting a scheduled time in the predefined schedule:
obtaining the one or more second OS patches from one or more repositories; and
installing the one or more second OS patches on the VMs.

2. The method of claim 1, further comprising:
prior to obtaining the one or more second OS patches, receiving, from a user computing device associated with the user account, second input data associated with the one or more second OS patches, wherein the second input data comprises at least one of:
a first request to add a first OS patch to the one or more second OS patches; or
a second request to remove a second OS patch from the one or more second OS patches.

3. The method of claim 1, further comprising:
receiving an additional OS patch associated with the OS during the period of time;
evaluating the approval rule against the additional OS patch to approve the additional OS patch for deployment; and
subsequent to the period of time, deploying the additional OS patch on the VMs.

4. The method of claim 1, further comprising providing the user account with access to patch-compliance status information indicating that at least one of the one or more second OS patches is critical to be deployed on the VMs.

5. A system comprising:
one or more processors; and
one or more non-transitory computer-readable media storing computer executable instructions that, when executed by the one or more processors, cause the one or more processors to perform operations comprising:
executing, in a cloud provider network, one or more applications on virtual machines (VMs) on behalf of a user account registered with the cloud provider network;
identifying first operating system (OS) patches associated with an OS installed on the VMs;
determining patch-compliance information for the first OS patches;
providing the user account with access to the patch-compliance information, the patch-compliance information comprising:
a first indication of a critical OS patch that is not deployed on the OS of the VMs; and
a second indication of a non-critical patch that is not deployed on the OS of the VMs;
receiving, from the user account, second input data to identify one or more second OS patches that are approved for deployment on the VMs the second input data indicating that at least one of the critical OS patch or the non-critical patch is to be deployed on the OS of the VMs; and
based at least in part on receiving the second input data, installing the one or more second OS patches on the VMs.

6. The system of claim 5, the operations further comprising:
prior to installing the one or more second OS patches, receiving, from a user computing device associated with the user account, third input data associated with the one or more second OS patches, wherein the input data comprises at least one of:
a first request to add a first OS patch to the one or more second OS patches; or
a second request to remove a second OS patch from the one or more second OS patches.

7. The system of claim 5, the operations further comprising receiving, from a user computing device associated with the user account, an approval rule indicating a criterion for approving received OS patches for deployment.

8. The system of claim 5, the operations further comprising:
receiving an additional OS patch associated with the OS during a period of time during which received OS patches are not to be deployed;
evaluating an approval rule against the additional OS patch to approve the additional OS patch for deployment; and
subsequent to the period of time, deploying the additional OS patch on the VM.

9. One or more non-transitory computer-readable media storing computer executable instructions configure to, when executed by one or more processors, cause the one or more processors to perform operations comprising:
executing, in a cloud provider network, one or more applications on virtual machines (VMs) on behalf of a user account registered with the cloud provider network;
identifying first operating system (OS) patches associated with an operating system installed on the VMs;
receiving, from the user account, first input data indicating a predefined schedule according to which received OS patches are to be automatically installed on the VMs for the user account;
determining, based at least in part on the predefined schedule, to refrain from deploying the first OS patches on the VMs for a period of time;
receiving, from the user account, an approval rule that indicates at least one of:
an approved OS patch that is approved to be installed on the VMs of the user account; or
a denied OS patch that is disallowed from being installed on the VMs of the user account;
evaluating the approval rule against individual ones of the first OS patches to identify one or more second OS patches that are approved for deployment on the VMs;
based at least in part on detecting a scheduled time in the predefined schedule:
obtaining the one or more second OS patches from one or more repositories; and
installing the one or more second OS patches on the VMs.

10. The one or more non-transitory computer-readable media of claim 9 configured to perform further operations comprising:
prior to obtaining the one or more second OS patches, receiving, from a user computing device associated with the user account, second input data associated with the one or more second OS patches, wherein the second input data comprises at least one of:
a first request to add a first OS patch to the one or more second OS patches; or
a second request to remove a second OS patch from the one or more second OS patches.

11. The one or more non-transitory computer-readable media of claim 9 configured to perform further operations comprising receiving, from a user computing device associated with the user account, the approval rule indicating a criterion for approving received OS patches for deployment.

12. The one or more non-transitory computer-readable media of claim 9 configured to perform further operations comprising:
receiving an additional OS patch associated with the OS during the period of time;
evaluating the approval rule against the additional OS patch to approve the additional OS patch for deployment; and
subsequent to the period of time, deploying the additional OS patch on the VMs.

13. The method of claim 1, further comprising receiving second input from the user account that indicates particular OS patches are critical patches that are to be approved for deployment,
wherein evaluating the approval rule against individual ones of the first OS patches to identify one or more second OS patches that are approved for deployment on the VMs includes:
determining that the one or more second OS patches are indicated as critical OS patches; and
determining that the approval rule approves critical OS patches for deployment.

14. The method of claim 1, wherein evaluating the approval rule against individual ones of the first OS patches to identify one or more second OS patches that are approved for deployment on the VMs includes:
determining that the approval rule specifies a particular OS patch of the first OS patches as being excluded from deployment; and
refraining from approving the particular OS patch for deployment.

15. The method of claim 1, the VMs including a first group of VMs and a second group of VMs, the method further comprising:
receiving second input data from the user account indicating that the one or more second OS patches are to be deployed on the first group of VMs and not the second group of VMs,
wherein the one or more second OS patches are deployed on the first group of VMs and not the second group of VMs.

16. The method of claim 1, wherein the VMs comprise a fleet of VM instances, the method further comprising:
receiving, from the user account, second input data indicating a request for a patch-management service of the cloud provider network to manage OS patches for the VMs;
based at least in part on the request, installing an instance of a patch-management agent on each VM instance in the fleet of VM instances; and
providing each instance of the patch-management agent with an indication of the one or more repositories in which the one or more second OS patches are stored.

17. The method of claim 1, further comprising:
running, in the cloud provider network, a second applications on second VMs on behalf of a second user account registered with the cloud provider network;
receiving a second approval rule from the second user account, the second approval rule being different from the approval rule;
evaluating the second approval rule against individual ones of the first OS patches to identify one or more third OS patches that are approved for deployment on the second VMs; and
installing the one or more third OS patches on the VMs.

* * * * *